United States Patent [19]
Liu

[11] Patent Number: 5,660,297
[45] Date of Patent: Aug. 26, 1997

[54] NON-SCREW ASSEMBLED CASING FOR COMPUTER MAINFRAME

[75] Inventor: Morgan C. Liu, Taoyuan, Taiwan

[73] Assignee: Enlight Corporation, Taoyuan, Taiwan

[21] Appl. No.: 327,922

[22] Filed: Oct. 24, 1994

[51] Int. Cl.$^6$ .................................................. B65D 6/00
[52] U.S. Cl. ........................................ 220/4.02; 220/4.32
[58] Field of Search ............................. 220/4.08, 4.02, 220/4.09, 4.32, 23.4; 312/208.1, 290

[56] References Cited

U.S. PATENT DOCUMENTS

| | | | |
|---|---|---|---|
| 1,698,252 | 1/1929 | Ashe | 220/4.32 |
| 1,737,824 | 12/1929 | Brower | 220/4.02 X |
| 2,906,482 | 9/1959 | Flint | 220/4.02 X |
| 3,020,112 | 2/1962 | Snapp, Jr. | 220/4.02 X |
| 3,563,578 | 2/1971 | Meller | 220/4.32 X |
| 3,598,274 | 8/1971 | Snyder | 220/4.02 |
| 4,274,547 | 6/1981 | Takagi et al. | 220/4.02 |
| 4,635,811 | 1/1987 | Lodi | 220/23.4 X |
| 4,909,579 | 3/1990 | Liu . | |
| 5,012,943 | 5/1991 | King | 220/4.32 |
| 5,123,680 | 6/1992 | Liu . | |
| 5,398,833 | 3/1995 | Klauss et al. | 220/4.02 |

*Primary Examiner*—Steven M. Pollard
*Attorney, Agent, or Firm*—Ladas & Parry

[57] ABSTRACT

A non-screw assembled casing for computer mainframe comprised of an upper cover, a base and a front panel wherein the non-screw assembling structure comprises a first coupling section structure, a second coupling section structure and a third coupling section structure. The first coupling section structure includes a plurality of first fastening units provided on the bottom edge of the inner right side of the upper cover and on the bottom edge of the right side of the base. The second coupling section structure includes a plurality of second fastening units provided on the bottom edge of the inner left side of the upper cover and on the bottom edge at the left of the base. And the third coupling section structure includes a plurality of third fastening units provided on the back side of the front panel, the periphery of the front side of the upper cover, and the front side of the base. By assembling the first coupling section structure to the second coupling section structure, causing the upper cover to be positioned on the base in the vertical (X-axis) direction and in the lateral (Y-axis) direction; and by assembling the third coupling section structure, causing the upper cover to be positioned in the longitudinal (Z-axis) direction along with the front panel, a structure can thus be provided into which the computer mainframe can be fixed without requiring fastening by screws.

3 Claims, 4 Drawing Sheets

5,660,297

NON-SCREW ASSEMBLED CASING FOR COMPUTER MAINFRAME

FIELD OF THE INVENTION

The present invention relates to a non-screw assembled casing for computer mainframe and, in particular, to an assembling structure capable of positioning a casing for computer mainframe comprised of an upper cover, a base and a front panel in the directions of X-, Y- and Z-axes without requiring fastening by screws.

BACKGROUND OF THE INVENTION

In U.S. Pat. No. 4,909,579 issued Mar. 20, 1990 assigned to the same applicant and entitled "CASING FOR CONSOLE (CPU) OF PERSONAL COMPUTER WITH EASY OPENING AND LOCKING MEANS", there is disclosed a mechanism for achieving the function of easy opening and locking of the cover body and the base by having the locking tabs provided on both sides of the cover body be securely fitted into the notches on both sides of the base in combination with slide rods pivotally coupled between the cover body and the base. In addition, in U.S. Pat. No. 5,123,680 issued Jun. 23, 1992 assigned to the same Applicant and entitled "FASTENING DEVICE FOR CONNECTING THE FRONT PANEL TO A COMPUTER CASING", there is disclosed a plurality of retaining elements secured to the front panel of a computer casing which are provided with a plurality of resilient locating legs such that the retaining elements can be positioned, along with the front panel, on the base by means of the returning force of said resilient locating legs after which have been inserted into retaining holes previously provided on the base.

According to the basic concept of the non-screw assembled casing for computer mainframe of the present invention, the upper cover is positioned on the base in the X-axis (vertical) direction and Y-axis (lateral) direction by means of a first coupling section structure and a second coupling section structure provided on the inner side of the upper cover and on both sides of the base, and in the Z-axis (longitudinal) direction by means of the third coupling section structure provided on the back side of the front panel, the periphery of the front side of the upper cover, and the front side of the base. As shown in the embodiment given in the present application, the first fastening units provided in the first coupling section structure and the second fastening units provided in the second coupling section structure are similar to the locking tab and notch fitting structure of the aforesaid ROC Patent Application No. 77208217, and the third fastening units provided in the third coupling section structure are similar to the resilient retaining elements of ROC Patent Application No. 79210388. The structure of the fastening units of the present invention is not limited to the above structure of elements. Rather, the present invention has its emphasis placed on that the upper cover and the base can be secured in the directions of the X-, Y-, and Z-axes without requiring fastening by screws. Therefore, the present invention provides a concept of securing the upper cover and the base in the directions of the X-, Y-, and Z-axes at the same time in a manner which has not yet been found in any prior art.

SUMMARY OF THE INVENTION

Therefore, the primary object of the present invention is to provide a non-screw assembled casing for computer mainframe comprised of an upper cover, a base and a front panel wherein the non-screw assembling structure comprises a first coupling section structure, a second coupling section structure and a third coupling section structure, the first coupling section structure including a plurality of first fastening units provided on the bottom edge of the inner right side of the upper cover and on the bottom edge of the right side of the base; the second coupling section structure including a plurality of second fastening units provided on the bottom edge of the inner left side of the upper cover and on the bottom edge of the left side of the base; and the third coupling section structure including a plurality of third fastening units provided on the back side of the front panel, the periphery of the front side of the upper cover, and the front side of the base. By assembling the first coupling section structure to the second coupling section structure, causing the upper cover to be positioned on the base in the vertical (X-axis) direction and in the lateral (Y-axis) direction, and by assembling the third coupling section structure, causing the upper cover to be positioned in the longitudinal (Z-axis) direction along with the front panel, a structure can thus be provided into which a computer mainframe can be fixed without requiring fastening by screws.

BRIEF DESCRIPTION OF THE INVENTION

The structure and function of the present invention will be described in conjunction with the accompanying drawings, in which.

DETAILED DESCRIPTION OF THE INVENTION

Figure 1:
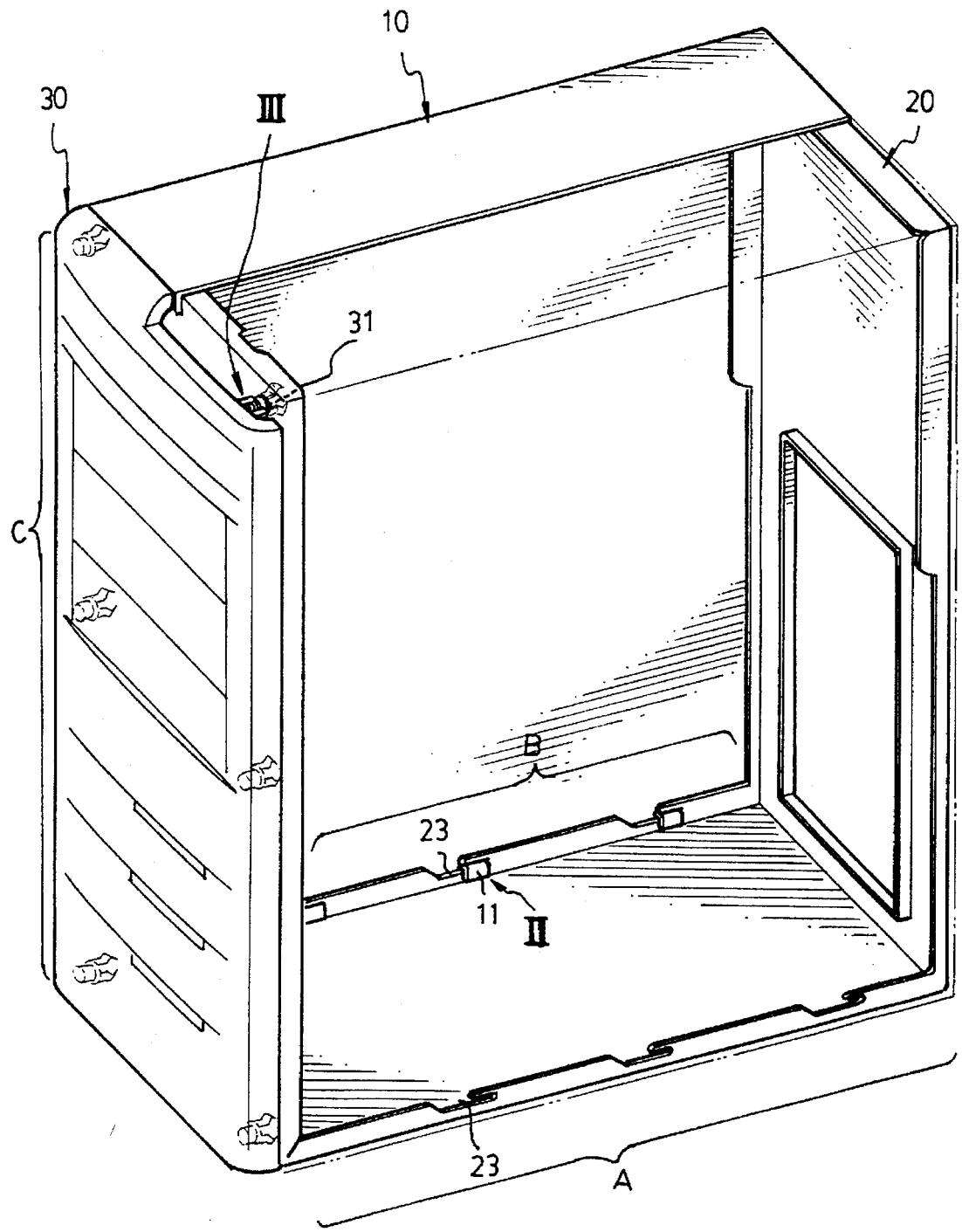
FIG. 1 is an overall perspective view of the casing for computer mainframe according to the present invention with the casing partly broken away showing the first coupling section structure, the second coupling section structure and the third coupling section structure.
Figure 2:
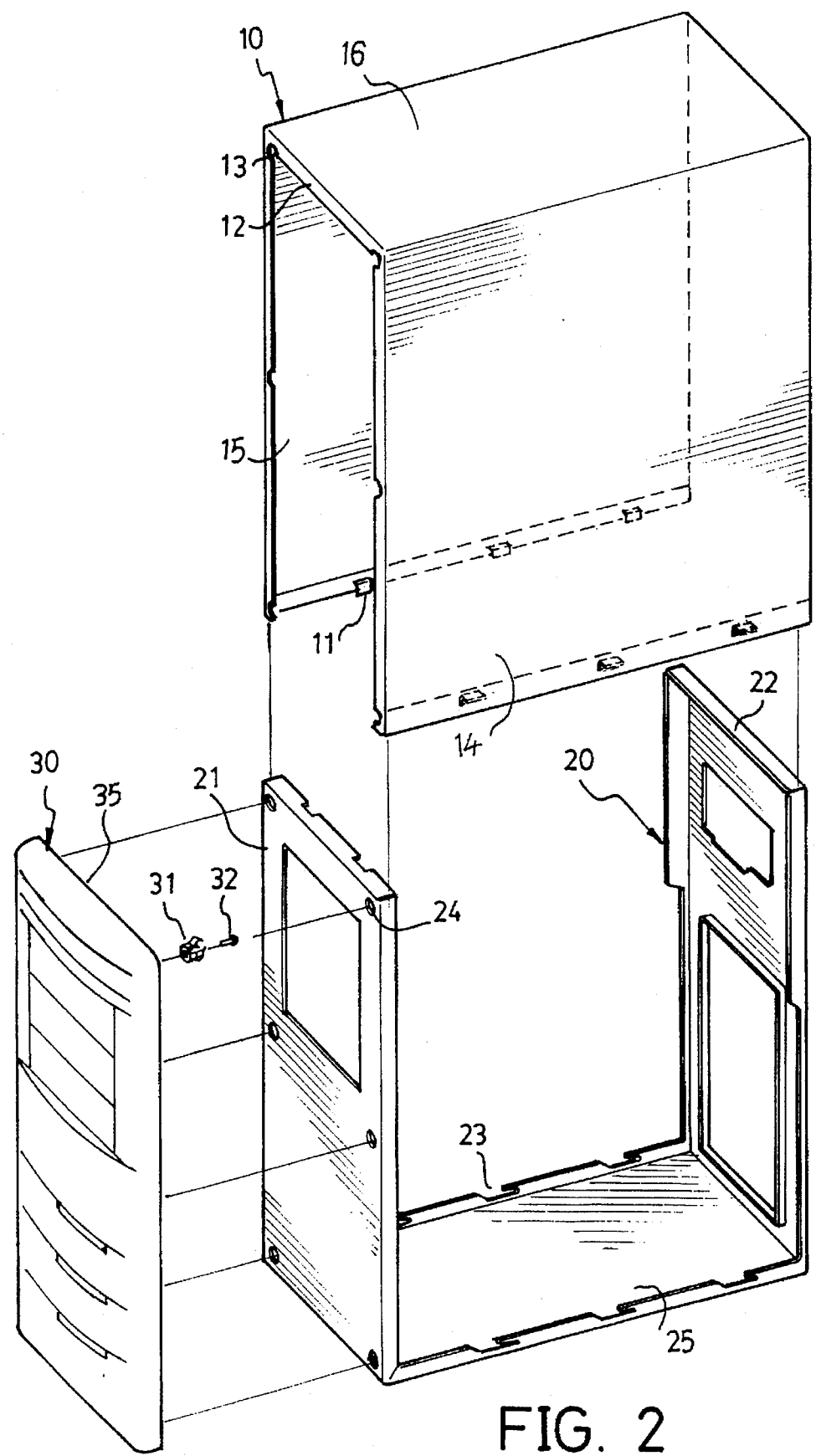
FIG. 2 is an exploded view showing the assembling of the first coupling section structure, the second coupling section structure and the third coupling section structure.

Referring to FIGS. 1 and 2, the non-screw assembled casing for computer mainframe according to the present invention consists of an upper cover 10, a base 20 and a front panel 30. The upper cover 10 is a ⊓-shaped thin plate body comprising a right side 14, a left side 15 and a top portion 16 and the base 20 is a ⊓-shaped thin plate body comprising a front side 21, a rear side 22 and a bottom portion 25 wherein the non-screw assembling structure comprises a first coupling structure A, a second coupling structure B and a third coupling structure C.

The first coupling structure A includes a plurality of first fastening units I provided on the bottom edge of the inner right side 14 of the upper cover 10 and on the bottom edge of the right side of the base 20. In the embodiment of the present invention, the plurality of first fastening units I include an interfitting structure composed of a plurality of locking tabs 11 provided on the bottom edge of the inner right side 14 of the upper cover 10 and a plurality of notches 23 provided correspondingly on the right side edge of the bottom portion 25 of the base 20.

The second coupling structure B includes a plurality of second fastening units II provided on the bottom edge of the inner left side 15 of the upper cover 10 and on the bottom edge of the left side of the base 20. In the embodiment of the present invention, the second fastening units II correspond in number and structure to the first fastening units I and include an interfitting structure composed of a plurality of locking tabs 11 provided on the bottom edge of the left side 15 of the upper cover 10 and a plurality of notches 23 provided correspondingly on the left side edge of the bottom portion 25 of the base 20.

Figure 3:
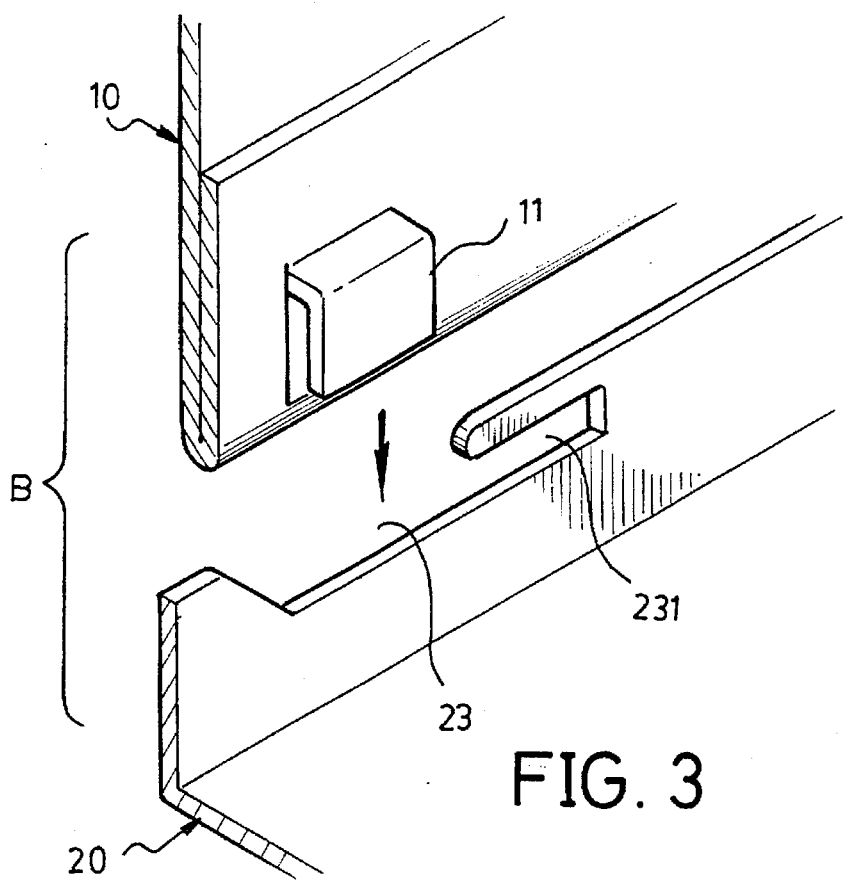
FIG. 3 is an enlarged view showing the second coupling section structure before the upper cover and the base are interfitted.
Figure 4:
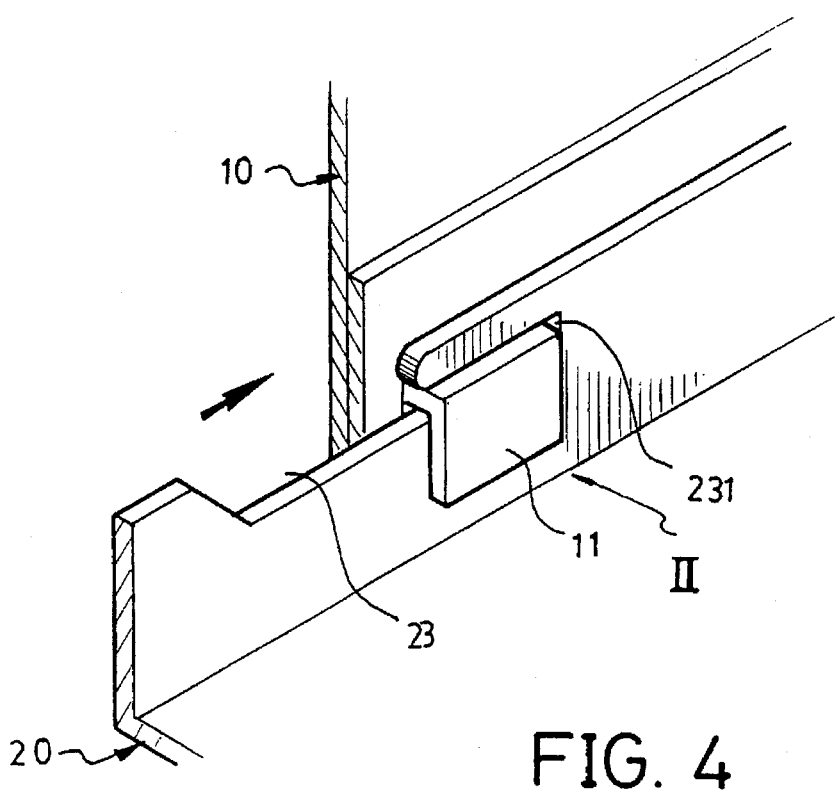
FIG. 4 is an enlarged view showing the second coupling section structure after the upper cover and the base are interfitted.
Figure 5:
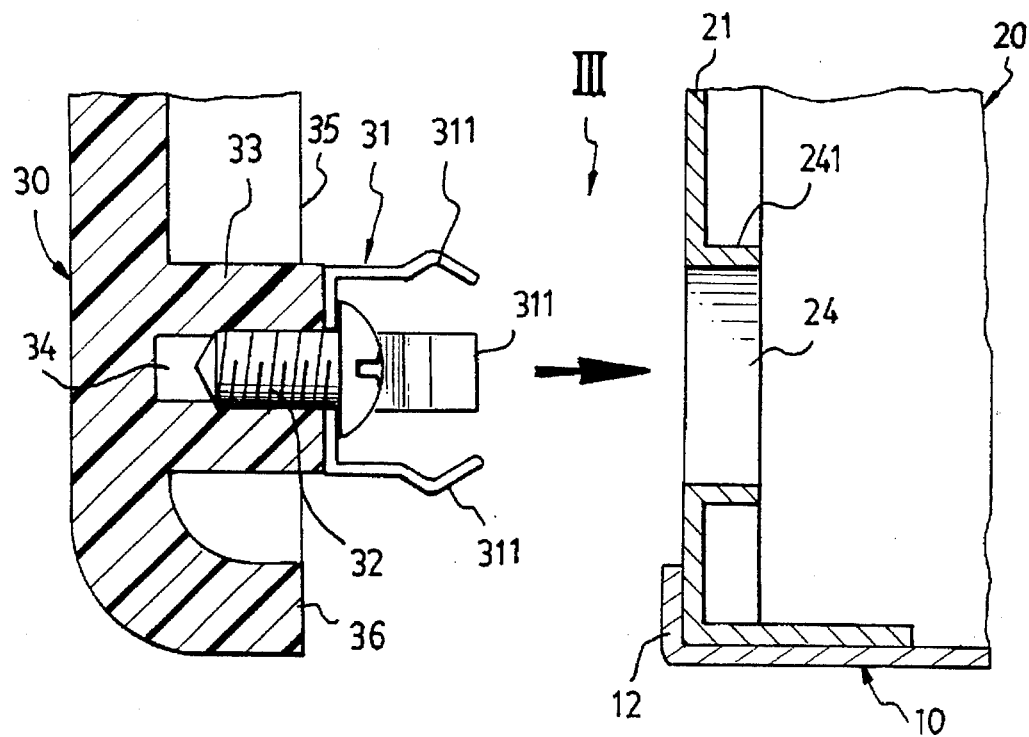
FIG. 5 is an enlarged view showing the third coupling section structure before the front panel, the leading edge of the upper cover and the front side of base are interfitted.
Figure 6:
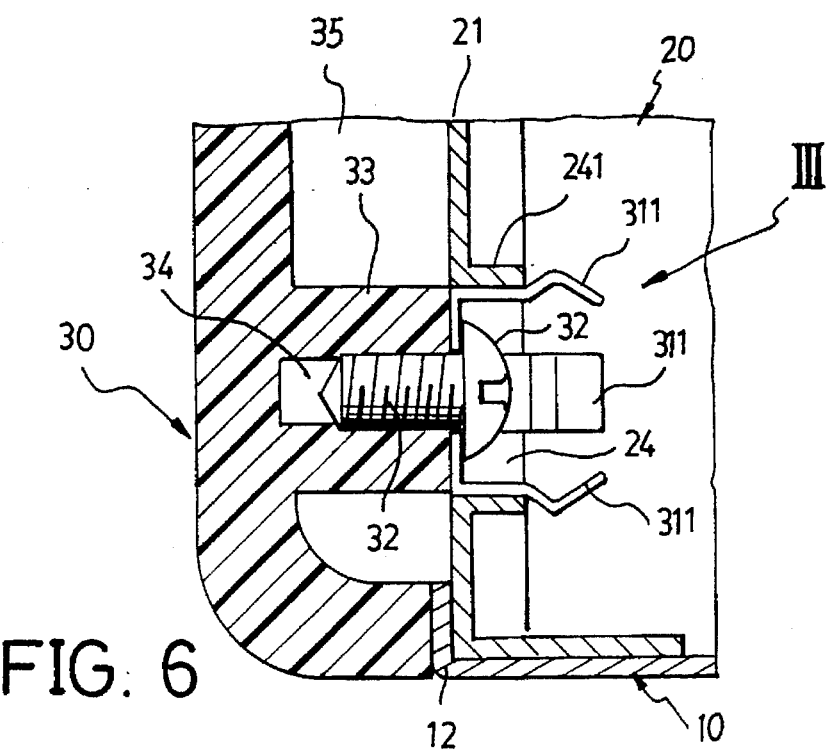
FIG. 6 is an enlarged view showing the third coupling section structure after the front panel, the leading edge of the upper cover and the front side of base are interfitted.

Referring now to FIGS. 3 and 4, the second coupling structure B is constituted by moving the upper cover 10 to the place where the locking tabs 11 are in positions corresponding to the notches 23, and by having the locking tabs 11 pushed into a narrowed portion 231 such that the upper cover 10 can be positioned on the base 20 in the vertical (X-axis) and the lerteral (Y-axis) directions. However, the upper cover 10 relies on the third coupling structure C for being positioned on the base 20 in the longitudinal (Z-axis) direction.

The third coupling structure C includes a plurality of third fastening units III provided on the back side 35 of the front panel, a front edge 12 of the upper cover and the front side 21 of the base. Each of the third fastening units III includes a projected post 33 on the back side 35 of the front panel, said posts 33 being each provided with a threaded hole 34 in the center thereof; a retaining element 31 provided with a plurality of locating legs 311; a screw 32 which can be screwed into the threaded hole 34 for securing the retaining element 31 on the front panel 30; a hole 24 having a flange 241 provided on the front side 21 of the base. In addition, the leading edge 12 of the upper cover 10 overlaps on the edge of the front side 21 of the base, a cutout 13 being left thereon to avoid the hole 24 from being masked by the leading edge 12. When the front panel 30 is pushed to abut against the front side 21 of the base, extended through the recessed edge 241, and then opens outwardly to become tightly engaged and secured such that the leading edge 12 of the upper cover 10 can be held in position by the periphery 36 of the front panel 30. This is the manner in which the upper cover 10 is positioned on the base 20 in the longitudinal (Z-axis) direction.

Although the present invention has been described with an embodiment in which the overall assembly of the casing for the computer mainframe can be accomplished by means of the interfitting structure of the three coupling structures, said embodiment for the upper cover to be positioned on the base in the vertical (X-axis), the lateral (Y-axis) and the longitudinal (Z-axis) directions serves only to explain the manner for positioning in the directions of the X-axis, the Y-axis and the Z-axis. It should be understood that various modifications and alterations can be made to the embodiment by those skilled in the art without departing from the spirit of the present invention. For example, the manner in which the locking tabs and the notches are fastened can be changed (for example, by resilient holding), or the fastening elements are positioned on the front panel by permanent holding instead of by screw fixing. So long as the upper cover, the base and the front panel are integrally assembled and positioned in the directions of the X-axis, the Y-axis and the Z-axis by means of the first coupling structure, the second coupling structure and the third coupling structure, the various elements of the fastening units can be altered. All such modifications and alterations should be considered as falling within the scope of the present invention which is defined by the appended claims.

I claim:

1. A non-screw assembled casing for a computer mainframe, comprising:

an upper cover, a base and a front panel, the upper cover including a right side, a left side, a top portion, a leading edge on the right side projecting toward the heft side and a leading edge on the left side projecting toward the right side, the base including a front side having holes therethrough, a rear side and a bottom portion, and the front panel being for attachment to the front side of the base;

first coupling means on a bottom edge of the right side of the upper cover and a bottom edge of the right side of the base for coupling the upper cover to the base, the first coupling means comprising a plurality of first non-screw fastening units, each of the first non-screw fastening units comprising a locking tab on the bottom edge of the right side of the upper cover and projecting toward the left side of the upper cover and a complementary notch on the bottom edge of the right side of the base;

second coupling means on a bottom edge of the left side of the upper cover and a bottom edge of the left side of the base for coupling the upper cover to the base, the second coupling means comprising a plurality of second non-screw fastening units each of the first non-screw fastening units comprising a locking tab on the bottom edge of the left side of the upper cover and projecting toward the right side of the upper cover and a complementary notch on the bottom edge of the left side of the base; and third coupling means on a back side of the front panel and the front side of the base for coupling the front panel to the front side of the base with the leading edges of the upper cover held therebetween, the third coupling means comprising a plurality of third non-screw fastening units, each of the third non-screw fastening units comprising a retaining element on the front panel having locating legs for projecting through one of the holes of the front side of the base and laterally expanding;

wherein the upper cover is positioned on the base in the vertical (X-axis) direction and the lateral (Y-axis) direction by the first and second coupling means, and in the longitudinal (Z-axis) direction by the third coupling means when the front panel is attached to the base and the coupling means are coupled.

2. The non-screw assembled casing according to claim 1, wherein the first coupling means is similar to the second coupling means.

3. The non-screw assembled casing according to claim 1, wherein the first non-screw fastening units and second non-screw fastening units correspond to each other in number and structure.

* * * * *